US010055037B2

(12) United States Patent
Lim et al.

(10) Patent No.: US 10,055,037 B2
(45) Date of Patent: Aug. 21, 2018

(54) MOBILE TERMINAL AND METHOD FOR OPERATING A MOBILE TERMINAL BASED ON TOUCH INPUT

(71) Applicant: Pantech Inc., Seoul (KR)

(72) Inventors: Hyeng-Keun Lim, Seoul (KR); Sung-Ryun Moon, Seoul (KR)

(73) Assignee: Pantech Inc., Seoul (KR)

( * ) Notice: Subject to any disclaimer, the term of this patent is extended or adjusted under 35 U.S.C. 154(b) by 778 days.

(21) Appl. No.: 13/713,500

(22) Filed: Dec. 13, 2012

(65) Prior Publication Data
US 2013/0222288 A1 Aug. 29, 2013

(30) Foreign Application Priority Data

Feb. 23, 2012 (KR) .................. 10-2012-0018503

(51) Int. Cl.
G06F 3/041 (2006.01)
G06F 3/0488 (2013.01)
G06F 3/0354 (2013.01)

(52) U.S. Cl.
CPC .......... *G06F 3/041* (2013.01); *G06F 3/03547* (2013.01); *G06F 3/04883* (2013.01)

(58) Field of Classification Search
None
See application file for complete search history.

(56) References Cited

U.S. PATENT DOCUMENTS

| 6,091,031 A * | 7/2000 | Lee ................... G06F 3/0488 178/18.01 |
| 7,208,916 B1 * | 4/2007 | Boatwright ......... H01M 10/425 320/150 |
| 2003/0117376 A1 * | 6/2003 | Ghulam ............... G06F 1/1626 345/173 |
| 2005/0012723 A1 * | 1/2005 | Pallakoff ............. G06F 1/1616 345/173 |
| 2006/0197750 A1 * | 9/2006 | Kerr ................... G06F 1/1626 345/173 |

(Continued)

FOREIGN PATENT DOCUMENTS

KR 10-2004-0037694 5/2004

OTHER PUBLICATIONS

U.S. Appl. No. 61/541,414, filed Sep. 2011, Aitchison; Bradley J.*

Primary Examiner — Patrick Edouard
Assistant Examiner — Peijie Shen
(74) Attorney, Agent, or Firm — H.C. Park & Associates, PLC

(57) ABSTRACT

A mobile terminal and methods for operating a mobile terminal based on a touch input, including receiving at least one touch input to a touch panel of the mobile terminal, the touch panel including a first input area and a second input area; generating at least one touch sensed signal corresponding to the at least one touch input to one or more of the first input area and the second input area; generating at least one control signal corresponding to the at least one touch sensed signal, wherein the first input area remains activated in a power off state of the mobile terminal and the second input area is initially deactivated in the power off state. The mobile terminal and methods for operating the mobile terminal based on a touch input thereby provide for an improved design and enhanced reliability of operation.

25 Claims, 15 Drawing Sheets

(56) References Cited

U.S. PATENT DOCUMENTS

| | | | |
|---|---|---|---|
| 2006/0227116 A1* | 10/2006 | Zotov | G06F 3/0418 345/173 |
| 2006/0238517 A1* | 10/2006 | King | G06F 1/1626 345/173 |
| 2009/0117945 A1* | 5/2009 | Mahler | H04M 1/6041 455/569.1 |
| 2009/0149127 A1* | 6/2009 | Viitamaki | H04M 1/725 455/41.2 |
| 2009/0303192 A1* | 12/2009 | Ho | G06F 1/3203 345/173 |
| 2010/0073303 A1* | 3/2010 | Wu | G06F 3/0485 345/173 |
| 2010/0134423 A1* | 6/2010 | Brisebois | G06F 3/03547 345/173 |
| 2010/0156795 A1* | 6/2010 | Kim | G06F 3/0416 345/168 |
| 2010/0171753 A1* | 7/2010 | Kwon | G06F 1/3218 345/593 |
| 2010/0214234 A1* | 8/2010 | Singhal | G06F 3/04883 345/173 |
| 2010/0235787 A1* | 9/2010 | Couse | H04M 1/2477 715/811 |
| 2010/0265209 A1* | 10/2010 | Nurmi | G06F 1/3265 345/174 |
| 2010/0269040 A1* | 10/2010 | Lee | G06F 3/04817 715/702 |
| 2011/0078568 A1* | 3/2011 | Park | G06F 3/04883 715/702 |
| 2011/0282785 A1* | 11/2011 | Chin | G06F 3/04883 705/42 |
| 2012/0032917 A1* | 2/2012 | Yamaguchi | G06F 3/0416 345/174 |
| 2012/0068946 A1* | 3/2012 | Tang | G06F 1/1684 345/173 |
| 2012/0105372 A1* | 5/2012 | Chang | G06F 1/3203 345/174 |
| 2012/0221966 A1* | 8/2012 | Inami | G06F 1/1641 715/761 |
| 2012/0233571 A1* | 9/2012 | Wever | G06F 3/048 715/835 |
| 2013/0016046 A1* | 1/2013 | Chou | G06F 1/3262 345/173 |
| 2013/0069888 A1* | 3/2013 | Cho | G06F 1/3265 345/173 |
| 2013/0069903 A1* | 3/2013 | Geiger | G06F 3/0488 345/174 |
| 2013/0076649 A1* | 3/2013 | Myers | H04M 1/0268 345/173 |
| 2013/0187863 A1* | 7/2013 | Rydenhag | G06F 1/3218 345/173 |
| 2013/0307769 A1* | 11/2013 | Sharma | G06F 1/3215 345/156 |
| 2014/0145927 A1* | 5/2014 | Chang | G06F 3/0482 345/156 |
| 2014/0225855 A1* | 8/2014 | Aitchison | G06F 3/041 345/173 |
| 2014/0253487 A1* | 9/2014 | Bezinge | G04G 17/045 345/173 |
| 2015/0138120 A1* | 5/2015 | Le | G06F 3/0488 345/173 |
| 2015/0235594 A1* | 8/2015 | Lombardi | G09G 3/3208 345/173 |

* cited by examiner

1. POWER ON/OFF OPERATION: <u>LONG KEY TOUCH & DRAG</u> FROM UP (A) TO DOWN (B THROUGH E)
2. HOLD/END KEY OPERATION: <u>SHORT KEY TOUCH & DRAG</u> FROM UP (A) TO DOWN (B THROUGH E)

VOLUME UP/DOWN SHORT KEY OPERATION: DRAG & FLICK FROM UP (DOWN) TO DOWN (UP)

MOBILE TERMINAL AND METHOD FOR OPERATING A MOBILE TERMINAL BASED ON TOUCH INPUT

CROSS-REFERENCE TO RELATED APPLICATION

This application claims priority to and the benefits under 35 U.S.C. § 119(a) of Korean Patent Application No. 10-2012-0018503, filed on Feb. 23, 2012, the contents of which are herein incorporated in its entirety by reference for all purposes as if fully set forth herein.

BACKGROUND

Field

Exemplary embodiments relate to a mobile terminal and method for operating a mobile terminal based on a touch input.

Discussion of the Background

In order to power on a general mobile terminal, a user typically has to use a power on key installed on the outer surface of the mobile terminal. Generally, the power on key is a tact switch or a dome switch mounted on a Flexible PCB (FPCB). If the user presses the power on key to supply power to the mobile terminal, the power on key functions as an event input key for executing an End/Hold function, etc. of the mobile terminal.

The mobile terminal also has volume keys separately installed on the outer surface of the mobile terminal. The volume keys are tact switches, dome switches, jog keys, etc. As such, the power on key and volume keys are typically configured as mechanical switches, and transmit an event, such as power on/off, hold, and volume up/down, to the central processing unit (CPU) of the mobile terminal to execute the event according to a user input operation received through the corresponding power on key and volume keys. However, such mechanical switches may have high instrumental and design limitations and, furthermore, the mechanical switches may be subject to a significant deterioration in reliability, such as where the mechanical switches are used for a relatively long time.

SUMMARY

Exemplary embodiments relate to a mobile terminal and methods for operating a mobile terminal based on a touch input, having an improved design and enhanced reliability of operation.

Exemplary embodiments provide a mobile terminal to operate based on a touch input, the mobile terminal including: a touch panel including a first input area and a second input area to receive at least one touch input to generate at least one touch sensed signal; and a touch sensing unit to generate at least one control signal corresponding to the at least one touch sensed signal, wherein the first input area remains activated in a power off state of the mobile terminal and the second input area is initially deactivated in the power off state.

Exemplary embodiments further provide a mobile terminal to operate based on a touch input, the mobile terminal including: a touch panel to receive at least one touch input to generate at least one touch sensed signal; a touch sensing unit to generate at least one control signal corresponding to the at least one touch sensed signal, wherein the touch panel comprises a plurality of input areas, and wherein an input area less than the plurality of input areas is activated in a power off state of the mobile terminal to receive the touch input to generate the touch sensed signal to enable generation of the corresponding control signal for a power on state of the mobile terminal, and at least one input area other than the activated input area is initially deactivated in the power off state.

Exemplary embodiments further provide a method for operating a mobile terminal based on a touch input, including: receiving at least one touch input to a touch panel of the mobile terminal, the touch panel including a first input area and a second input area; generating at least one touch sensed signal corresponding to the at least one touch input to one or more of the first input area and the second input area; generating at least one control signal corresponding to the at least one touch sensed signal, wherein the first input area remains activated in a power off state of the mobile terminal and the second input area is initially deactivated in the power off state.

Exemplary embodiments additionally provide a method for operating a mobile terminal based on a touch input, including: activating a first input area of a touch panel of the mobile terminal to generate at least one touch sensed signal in a power off state of the mobile terminal; inactivating a second input area of the touch panel in the power off state; activating the second input area of the touch panel to generate at least one touch sensed signal when the at least one touch sensed signal from the first input area in the power-off state is generated; and generating at least one control signal corresponding to the generated at least one touch sensed signal from one or more of the first input area or the second input area.

Additional features of the invention will be set forth in the description which follows, and in part will be apparent from the description, the drawings and the claims, or may be learned by practice of the invention.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
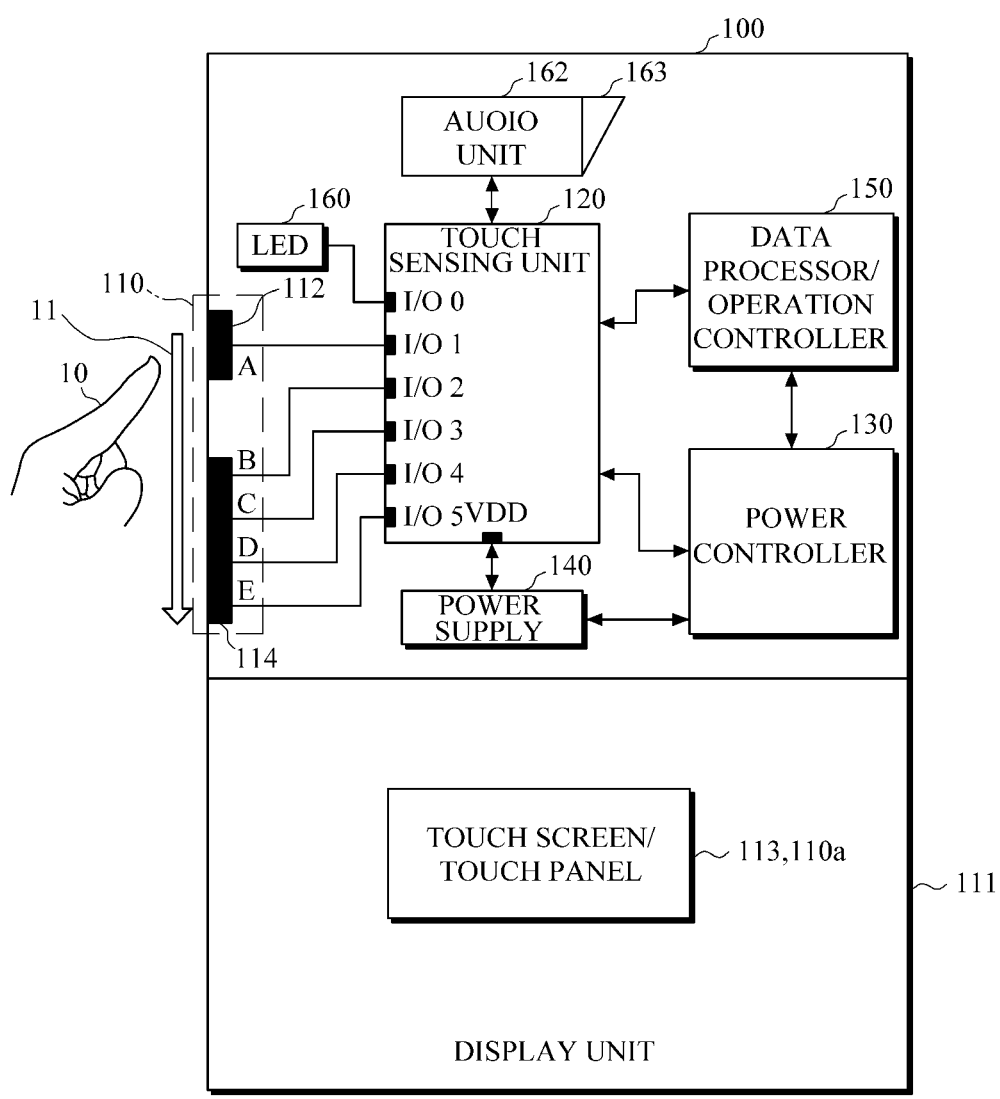
FIG. 1 is a diagram illustrating a mobile terminal operating based on a touch input according to exemplary embodiments of the present invention.

Throughout the drawings and the detailed description of the illustrated embodiments, unless otherwise described, the same drawing reference numerals will be understood to refer to the same elements, features, and structures. The relative size and depiction of these elements may be exaggerated for clarity, illustration, and convenience, and should not be construed in a limiting sense.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

The following description of exemplary embodiments is provided to assist in gaining a comprehensive understanding of the methods, apparatuses, and/or systems described herein. Accordingly, various changes, modifications, and equivalents of the methods, apparatuses, and/or systems described herein will be suggested to those of ordinary skill in the art, and should not be construed in a limiting sense. Also, descriptions of well-known functions and constructions may be omitted for increased clarity and conciseness.

It will be understood that when an element is referred to as being "connected to" another element, it can be directly connected to the other element, or intervening elements may be present; and, as to wireless communication, may be interpreted as being wirelessly connected, such as a wireless connection between a terminal and a base station or external server, for example.

Hereinafter, a mobile terminal may include, for example, a terminal, a mobile communication terminal, handheld, portable or tablet computer or communication devices, or other apparatuses, and methods for operating a mobile terminal based on a touch input, will be described in more detail with reference to the drawings, and should not be construed in a limiting sense. Also the mobile terminal, and the components, devices and units of the mobile terminal herein described, include hardware and software, and can also include firmware, to perform various functions of the mobile terminal including those for operating a mobile terminal based on a touch input, including those described herein, as may be known to one of skill in the art. As such, mobile terminal as used herein should not be construed in a limiting sense and may include the above and other apparatus for operating a mobile terminal based on a touch input.

Also, a mobile terminal may include, for example, any of various devices or structures used for wireless or wired communication of location information and personal information and can be wired or wireless connected to a base station, server or network, and may include another mobile terminal, and also may include hardware, firmware, or software to perform various functions for operating a mobile terminal based on a touch input, including those described herein, as may be known to one of skill in the art.

Hereinafter, a mobile terminal, such as including, for example, a terminal, a mobile terminal, a mobile communication terminal, handheld, portable or tablet computer or communication devices, or other apparatuses, and methods for operating a mobile terminal based on a touch input, will be described in more detail with reference to the drawings.

FIG. 1 is a diagram illustrating an example of a mobile terminal 100 operating based on a touch input to the mobile terminal 100 according to exemplary embodiments of the present invention.

Referring to FIG. 1, the mobile terminal 100 includes a touch panel 110, a touch sensing unit 120, a power controller 130, a power supply 140, a data processor/operation controller 150, and a light-emitting diode (LED) display 160. As described previously, the mobile terminal 100 may any of various devices, such as a mobile phone, a MP3 player, a smart phone, a personal computer, etc., for example The mobile terminal 100 may further include a display unit 111 including a touch screen 113 that receives a user input for controlling an application in a power on state and displays the execution results of the application according to the user input, such as in relation to various communication modules, a GPS receiver, a memory, etc., for example. The touch panel 110 may have a simplified mechanical structure of a touch-based switch module, instead of a conventional mechanical structure of a switch module configured with a power key, a hold key, and volume keys, for example. The touch screen 113 may also include a touch panel 110a to receive a user input to the mobile terminal 100, and the touch panel 110a may be additional to and may be separate from the touch panel 110 to receive user input to the mobile terminal 100.

The terminal 100, including the touch panel 110, the touch sensing unit 120 including controller 210, register 212 and memory 220 (FIG. 2), the power controller 130, the power supply 140, the data processor/operation controller 150, the light-emitting diode (LED) display 160, the audio unit 162 and the display unit 113, including the touch screen 113 and touch panel 110a, are associated with and may include any of various memory or storage media for storing software, program instructions, data files, data structures, and the like, and are associated with and may also include any of various processors, computers or application specific integrated circuits (ASICs) for example, to implement various operations to provide for operating a mobile terminal based on a touch input, such as mobile terminal 100, as described herein.

The software, media and program instructions may be those specially designed and constructed for the purposes of the present invention, or they may be of the kind well-known and available to those having skill in the computer software arts. Examples of program instructions include both machine code, such as produced by a compiler, and files containing higher level code that may be executed by the computer using an interpreter. The described hardware devices and units may, for example, include hardware, firmware or other modules to perform the operations of the described embodiments of the present invention.

In the mobile terminal 100, the touch panel 110 may be installed separately from a general touch screen, such as touch screen 113, for controlling applications of the mobile terminal 100, and may operate independently from the touch screen 113. The touch panel 110 is activated or deactivated under the control of the touch sensing unit 120. The touch panel 110 includes a first input area 112 and a second input area 114, and receives a touch gesture or touch input by a user 10 of the mobile terminal 100, such as indicated by the arrow 11, for example, of touching the first input area 112 and/or the second input area 114 to thereby generate a touch sensed signal corresponding to the input touch gesture of the user 10 according to exemplary embodiments.

The first input area 112 of the touch panel 110 may include at least one touch sensor A that can receive one or more touch inputs, and the second input area 114 may include a plurality of touch sensors B, C, D and E, for example, that can receive a plurality of touch inputs from a user 10 of the mobile terminal 100. The touch sensors A, B, C, D and E included in the first input area 112 and the second input area 114 may be various types of touch sensors, such as capacitive touch sensors, resistive touch sensors, and pressure sensors, for example, according to exemplary embodiments.

The first input area 112 and the second input area 114 may be configured on the same Flexible PCB (FPCB) or on different FPCBs. FIG. 1 illustrates an example where the first input area 112 and the second input area 114 are positioned in the left side of the mobile terminal 100. However, this is only an example, and the touch panel 110 and touch sensors A, B, C, D and E can be placed in any of various areas or portions of the mobile terminal 100, for example, according to exemplary embodiments. For example, it is possible that the first input area 112 is positioned in the upper part or side of the mobile terminal 100 and the second input area 114 is positioned in the left/right part or side of the mobile terminal 100. As another example, it is also possible that the first input area 112 is positioned in the left/right part or side of the mobile terminal 100 and the second input area 114 is positioned in the backside of the mobile terminal 100. Therefore, the position and location of the first input area 112 and the second input area 114 should not be construed in a limiting sense.

If a user's gesture of touching the first input area 112 is sensed, the mobile terminal 100 may be powered on or off. However, the mobile terminal 100 may also perform another function, such as mode conversion (for example, conversion into a hold on mode), based upon sensing a user's gesture to the first input area 112, for example. However, if a user's gesture of touching the second input area 114 is sensed, the mobile terminal 100 may perform volume control, for example. However, the mobile terminal 100 may also perform turning the page, etc. according to an application execution state of the mobile terminal 100, such based on sensing a user's gesture to second input area 114, for example. The exemplary user gestures input to the first input area 112 and the second input area 114 may be a same gesture or different gestures, or may be a same or different gesture input or applied with different time duration, for example.

Also, in the mobile terminal 100, if the user's gesture of touching at least one of the first input area 112 and the second input area 114 is received by the mobile terminal 100, a touch sensed signal is generated and transferred to the touch sensing unit 120 of the mobile terminal 100.

The touch sensing unit 120 is connected to the power supply 140 of the terminal 100 that supplies current to the entire or a part of the touch panel 110 to activate (or deactivate) the entire or part of the touch panel 110, thereby controlling the operation of the touch panel 110. The touch sensing unit 120 may receive a touch sensed signal generated according to a touch gesture of touching the touch panel 110, such as a touch input gesture to at least one of the first input area 112 or the second input area 114, generate control signals in response to the touch sensed signal, and transfer the control signals to the power controller 130 and the data processor/operation controller 150, respectively. Hereinafter, the control signal that is transferred from the touch sensing unit 120 to the power controller 130 is referred to as a power control signal, and the control signal that is transferred from the touch sensing unit 120 to the data processor/operation controller 150 is referred to as a user input interrupt signal.

As illustrated in FIG. 1, the touch sensing unit 120 may include a plurality of input/output ports I/O 0, I/O 1, I/O 2, I/O 3, I/O 4, and I/O 5 for receiving a plurality of touch sensed signals. As shown in FIG. 1, the input/output port I/O 1 may be connected to the first input area 112, such as to touch sensor A, for example, and the input/output ports I/O 2, I/O 3, I/O 4, and I/O 5 may be connected to the second input area 114, such as to touch sensors B, C, D and E, for example. If the first input area 112 includes a plurality of touch sensors, the touch sensing unit 120 may include a plurality of input/output ports that are connected to the plurality of touch sensors of the first input area 112, for example, according to exemplary embodiments.

The touch sensing unit 120 generates a power control signal according to a state of the mobile terminal 100 or according to a touch sensed signal generated in response to a sensed touch gesture, and provides the power control signal to the power controller 130. The power control signal is also referred to as a PWR signal. Also, if a user input interrupt signal is transferred to the data processor/operation controller 150 according to a touch sensed signal generated in response to a sensed touch gesture, the touch sensing unit 120 may perform data reception/transmission with the data processor/operation controller 150 through a database such as inter-integrated circuit (I2C) scheme, or by memory 220, for example.

The power controller 130 controls the power supply 140 to supply power to the individual functional modules including the data processor/operation controller 150 of the mobile terminal 100. The power controller 130 may start or stop supplying power to the mobile terminal 100 or control power that is supplied to the mobile terminal 100, according to a power control signal such as generated based upon a touch input to touch panel 110, for example.

The power control signal that is transferred from the touch sensing unit 120 to the power controller 130 may have various types of waveforms according to a state of the mobile terminal 100 or according to a touch sensed signal generated in response to a sensed touch gesture. The power control signal may include a power supply start control signal for enabling the power controller 130 to power on the mobile terminal 100, a power supply stop control signal for enabling the power controller 130 to power off the mobile terminal 100, a hold on control signal for enabling the power controller 130 to hold on the mobile terminal 100, and a hold off control signal for enabling the power controller 130 to return the hold on state of the mobile terminal to the power on state, among others, for example, according to exemplary embodiments.

The power controller 130 may supply, when receiving a power supply start control signal, such as based on a touch input to touch panel 110, power to the mobile terminal 100 to perform power control according to an active mode in which the mobile terminal 100 operates normally, and stop, when receiving a power supply stop control signal, based on a touch input to touch panel 110, supplying power to the mobile terminal 100, such as where the mobile terminal 100 is not in the active mode, for example. Also, the power controller 130 may hold on, when receiving a hold on control signal, the mobile terminal 100 to thereby selectively prevent or stop power from being supplied to modules (for example, the touch screen 113) that do not operate. Also, when receiving a hold off control signal, such as based on a touch input to the touch panel 110, for example, the power controller 130 may perform power control according to the active mode in which the mobile terminal operates normally.

If a touch sensed signal is generated when the mobile terminal 100 is in a power off state, a power supply start control signal is generated, such as by a touch input to the touch panel 110, for example. Meanwhile, if a touch sensed signal is generated, such as by a touch input to the touch panel 110, for example, when the mobile terminal 100 is in a power on state, a user input interrupt signal is generated and transferred to the data processor/operation controller 150.

The data processor/operation controller 150 runs an application for operating the mobile terminal 100. That is, if the power controller 130 receives a power supply start control signal, the data processor/operation controller 150 receives power from the power controller 130 to thereby operate the mobile terminal 100.

If the mobile terminal 100 is powered off, such as by a touch input to the touch panel 110, for example, the touch sensing unit 120 activates the first input area 112 and deactivates the second input area 114, thereby minimizing power consumption when the mobile terminal 100 is in the power off state. If a touch sensed signal generated by sensing a touch onto the first input area 112 is maintained longer than a first time period, the touch sensing unit 120 may activate the second input area 114, according to exemplary embodiments. Then if a drag touch sensed signal is generated due to a drag touch onto the second input area 114, the touch sensing unit 120 may generate a power supply start control signal for supplying power to the mobile terminal 100, for example, according to exemplary embodiments.

The touch sensing unit 120 supplies power to the LED display 160 so that the LED display 160 emits light, in order to visually inform the user of the mobile terminal 100 that a touch input to the first input area 112 has been received and the second input area 114 has been activated, such as when the mobile terminal 100 is in a power off state, for example. The LED display 160 may be included in the mobile terminal 100, and a different kind of light-emitting device or an audio output device, such as included in audio unit 162, may be used instead of the LED display 160, according to exemplary embodiments.

Meanwhile, if a touch gesture of touching the second input area 114 is sensed when the mobile terminal 100 is in the power on state, the touch sensing unit 120 transfers a user input interrupt signal corresponding to the touch gesture to the data processor/operation controller 150, and the data processor/operation controller 150 may control an application being executed according to the user input interrupt signal, according to exemplary embodiments.

The power supply 140 may any suitable power supply, such as a fixed battery or a removable battery, and may be configured to be charged using an external power supply, for example.

Figure 2:
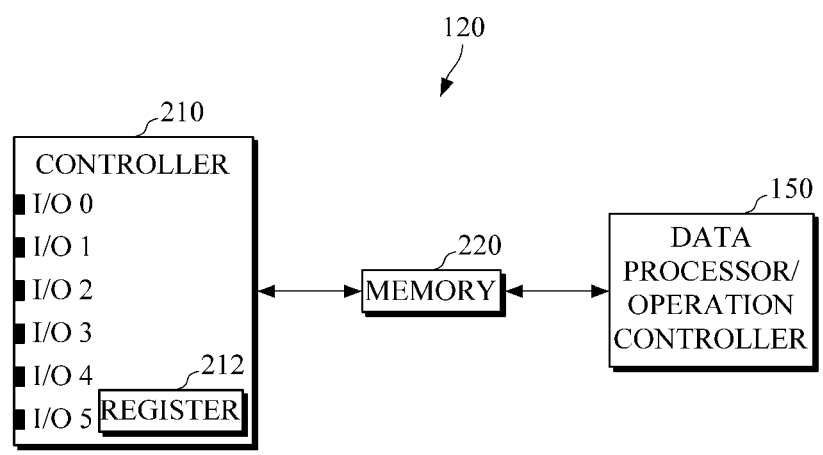
FIG. 2 is a diagram illustrating a touch sensing unit of the mobile terminal illustrated in FIG. 1 according to exemplary embodiments of the present invention.

FIG. 2 is a diagram illustrating an example of the touch sensing unit 120 of the mobile terminal 100 illustrated in FIG. 1 according to exemplary embodiments of the present invention.

Referring to FIG. 2, the touch sensing unit 120 may include a controller 210 and a memory 220. The controller 210 performs the operation of the touch sensing unit 120 based on data stored in the memory 220 and controls data to be stored in the memory 220, and the memory 220 may also store data, software and programs for operation of the mobile terminal 100, for example, including but not limited to those for operating the mobile terminal 100 based on a touch input, according to exemplary embodiments. The controller 210 may run an algorithm or algorithms for recognizing a touch input or a touch gesture onto the touch pad 110, as can be implemented by adapting or using various known software or programs for touch recognition, as known to those skilled in the art.

Referring to FIGS. 1 and 2, the controller 210 activates or deactivates the input/output ports I/O 0 through I/O 5 to control the touch panel 110. If the controller 210 receives a plurality of touch sensed signals such as by touch input to the touch panel 110, for example, when the mobile terminal 100 is in the power off state, the controller 210 generates a power supply start control signal for supplying power to the mobile terminal 100, such as to place the mobile terminal 100 in the active mode, and a state information may be supplied to the data processor/operation controller 150 to operate the mobile terminal 100 in the active mode, for example. However, if the controller 210 receives a plurality of touch sensed signals when the mobile terminal 100 in the power on state, the controller 210 generates a user input interrupt signal and transfers it to the data processor/operation controller 150, such as to execute an operation or an application by the mobile terminal 100, for example, according to exemplary embodiments.

The controller 210 may include a register 212 which the data processor/operation controller 150 can access information for operation states of the mobile terminal, such as based upon touch input to the touch panel 100, for example. The controller 210 and the data processor/operation controller 150 may be implemented as a single controller or a plurality of controllers in the mobile terminal 100, for example. The register 212 may include a first address in which state information indicating an operation mode of the mobile terminal 100 is written. Whenever the mobile terminal 100 enters each operation mode, the data processor/operation controller 150 may write state information indicating the corresponding operation mode as a first register value in the first address of the register 212. The controller 210 may deactivate a part of the touch pad 110 or change a scanning time interval at which a touch input onto the touch pad 110 is sensed, according to the first register value written in the register 212 by the data processor/operation controller 150, for example.

The controller 210 may write gesture state information indicating a touch gesture onto the touch panel 110, as a second register value, in a second address of the register 212. According to exemplary embodiments, the controller 210 may recognize a touch gesture of touching the second input area 114, and write a second register value representing a drag direction in the second address of the register 212. For example, if the data processor/operation controller 150 receives a user input interrupt signal, the data processor/operation controller 150 accesses the second address of the register 212 to read a second register value corresponding to gesture state information, and controls the operation of an application according to a touch gesture based on the user input interrupt signal and the gesture state information, according to exemplary embodiments.

The second register value may correspond to information for identifying a volume up gesture and a volume down gesture, and may be first gesture information corresponding to the volume up gesture and second gesture information corresponding to the volume down gesture, for example. The user input interrupt signal may include information regarding a time period for which a drag gesture of dragging the second input area 114 is maintained, for example.

Also, if the controller 210 senses a touch gesture input and determines that the touch gesture input satisfies at least one wrong, or incorrect, operation condition, the controller 210 may ignore the touch gesture input. However, if the controller 210 determines that the touch gesture input satisfies no wrong, or incorrect, operation condition, the controller 210 generates a power control signal for the touch gesture input, transfers the power control signal to the power controller 130, and transfers a user input interrupt signal according to the touch gesture input to the data processor/operation controller 150. A wrong, or incorrect, operation condition may be set for each reference touch gesture, such as a pre-set touch gesture, which can be recognized according to the operation state of the mobile terminal 100, for example, according to exemplary embodiments.

Figure 3:
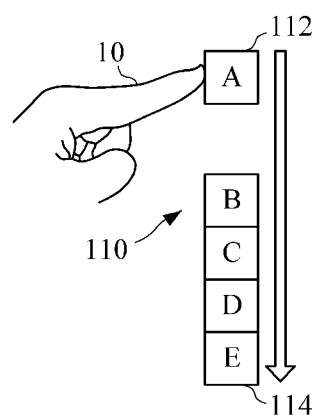
FIG. 3 illustrates a touch input for power control and hold control of a mobile terminal according to exemplary embodiments of the present invention.

FIG. 3 illustrates an example of a touch input for power control and hold control of the mobile terminal 100 according to exemplary embodiments of the present invention.

As described above, referring to FIGS. 1 and 3, the touch pad 110 includes the first input area 112 and the second input area 114. For example, it is assumed that the first input area 112 includes a single touch sensor A and the second input area 114 includes a plurality of touch sensors B, C, D, and E. The touch sensors B, C, D, and E of the second input area 114 may be arranged in a line to sense a drag gesture, and the arrangement direction of the touch sensors B, C, D, and E may be a vertical direction as shown in FIG. 3, or a horizontal or diagonal direction, and should not be construed in a limiting sense.

Continuing with reference to FIG. 3, a power on/off gesture input with respect to the mobile terminal 100 may be a "Long Key Touch & Drag" input of sequentially dragging the touch sensors B, C, D, and E of the second input area 114 after pressing the touch sensor A longer than a reference first time period, for example.

In more detail, when the mobile terminal 100 is in the power off state, only the touch sensor A is activated, for example. Then, if the touch sensor A senses a touch input of touching the first input area 112 longer than the reference first time period, the touch sensors B, C, D, and E of the second input area 114 are activated. Then, the mobile terminal 100 may turn on the LED display 160 to inform a user that the second input area 114 has been activated. Then, if the touch sensors B, C, D, and E sense a drag gesture, power is supplied to the individual functional modules of the mobile terminal 100 so that the mobile terminal 100 is powered on, such as in the active mode. However, if another "Long Key Touch & Drag" input is sensed when the mobile terminal 10 is in the power on state, the mobile terminal 100 may be powered off, for example.

The touch sensing unit 120 may determine whether a touch input satisfies exemplary reference wrong, or incorrect, operation conditions for "Long Key Touch & Drag", in order to detect a wrong, or incorrect, operation related to the "Long Key Touch & Drag" input. For example, a first reference wrong, or incorrect, operation condition for "Long Key Touch & Drag" is a condition in which touch sensed signals are sensed by the touch sensors C, D, and E when a touch sensed signal is sensed due to pressing of the touch sensor A, a second reference wrong, or incorrect, operation condition is a condition in which touch sensed signals are sensed by the touch sensors A, B, and C when a touch sensed signal is sensed due to pressing of the touch sensor E, and a third reference wrong, or incorrect, operation condition is a condition in which touch sensed signals are simultaneously sensed by three or more touch sensors of the touch sensors A, B, C, D, and E. However, any of various reference wrong, or incorrect, operation conditions may be established and determined corresponding to various sensed touch inputs to the touch panel 100, and the foregoing examples should not be construed in a limiting sense.

As to determining a wrong, or incorrect, operation condition being sensed, if a "Long Key Touch & Drag" gesture input to the touch panel 110 is recognized, the touch sensing unit 120 determines whether the "Long Key Touch & Drag" gesture input satisfies one of the first, second, and third reference wrong, or incorrect, operation conditions, for example. If the "Long Key Touch & Drag" gesture input satisfies none of the first, second, and third reference wrong, or incorrect, operation conditions, the touch sensing unit 120 may generate a power control signal and a user input interrupt signal in correspondence to the "Long Key Touch & Drag" gesture sensed. However, if the "Long Key Touch & Drag" gesture input satisfies one of the first, second, and third wrong, or incorrect, operation conditions, the touch sensing unit 120 may ignore the "Long Key Touch & Drag" gesture input, according to exemplary embodiments, for example.

Again, referring to FIG. 3, another example of a gesture input to the touch panel 110 may be a hold on/off gesture input with respect to the mobile terminal 100, such as may be a "Short Key Touch & Drag" input of sequentially dragging the touch sensors B, C, D and E of the second input area 114 after pressing the touch sensor A shorter than the first time period. If a "Short Key Touch & Drag" gesture is recognized when the mobile terminal 100 is in the power on state, the mobile terminal 100 enters a hold on state in which no touch input onto the touch screen 113 of display unit 111 of the mobile terminal 100 is processed. And if another "Short Key Touch & Drag" gesture is recognized when the mobile terminal 100 is in the hold on state, the mobile terminal 100 enters a hold off state (or an active state) in which the mobile terminal 100 operates normally, for example, according to exemplary embodiments.

Similarly, the touch sensing unit 120 may determine whether a touch input satisfies reference wrong, or incorrect, operation conditions for "Short Key Touch & Drag", in order to detect a wrong, or incorrect, operation related to "Short Key Touch & Drag". The reference wrong, or incorrect, operation conditions for "Short Key Touch & Drag" may be the same as the reference wrong, or incorrect, operation conditions for "Long Key Touch & Drag", as described above, for example, and again, should not be construed in a limiting sense.

Figure 4:
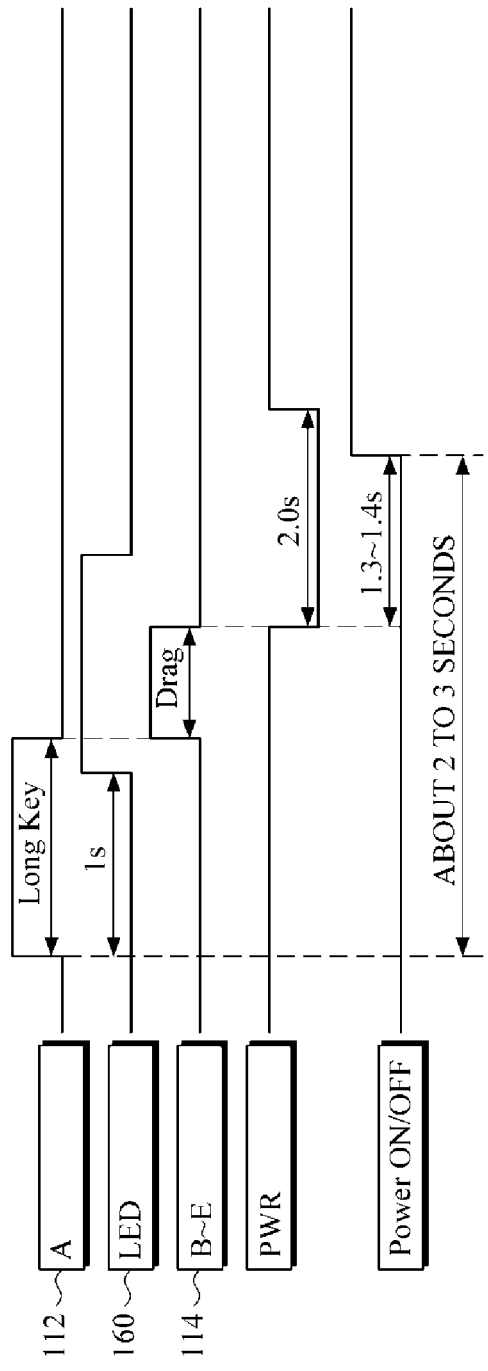
FIG. 4 is a timing diagram illustrating a signal pulse of the touch sensing unit according to a touch input for power on control of a mobile terminal according to exemplary embodiments of the present invention.

FIG. 4 is a timing diagram illustrating an example of a signal pulse of the touch sensing unit 120 according to a touch input for power on control of the mobile terminal 100 according to exemplary embodiments.

Referring to FIGS. 1 and 4, if the first input area 112 of the touch panel 110 is pressed or touched longer than a first reference time period (for example, one second) so that the touch sensor A senses a long key input when the mobile terminal 100 is in the power off state, the touch sensing unit 120 may turn on the LED display 160 to inform a user that a long key input has been sensed and input to the first input area 112. Also, then, if the touch sensors B, C, D, and E of the second input area 114 of the touch panel 110 are activated and a drag gesture is sensed by the touch sensors B, C, D, and E of the second input area 114, the touch sensing unit 120 supplies a power supply start control signal as a power control signal PWR to the power controller 130 so that the mobile terminal 100 is powered on, such as to the active mode. For example, the power control signal PWR may have a first waveform having signal fluctuation for about 2 seconds, as shown in FIG. 4.

However, for example, if a "Long Key Touch & Drag" gesture is sensed by the touch sensing unit 120 when the mobile terminal 100 is in the power on state, the touch sensing unit 120 supplies a power supply stop control signal to the power controller 130 so that the mobile terminal 100 is powered off. The power supply stop control signal may have the same waveform as the power supply start control signal, for example, according to exemplary embodiments.

Figure 5:
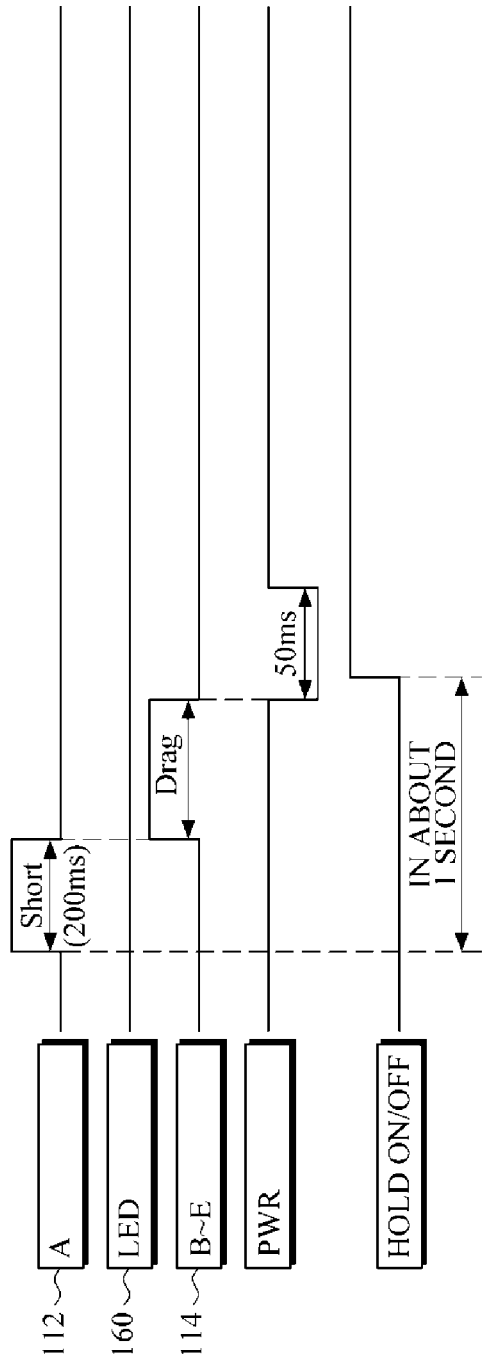
FIG. 5 is a timing diagram illustrating a signal pulse of the touch sensing unit according to a touch input for hold on control of a mobile terminal according to exemplary embodiments of the present invention.

FIG. 5 is a timing diagram showing an example of a signal pulse of the touch sensing unit 120 according to a touch input for hold on control of the mobile terminal 100 according to exemplary embodiments.

Referring to FIG. 1 and FIG. 5, when the mobile terminal 100 is in the power on state, if the touch sensor A of the first input area 112 is pressed or touched for a shorter time period than the reference first time period (for example, one second) as, for example, for 200 milliseconds (ms), so that the touch sensor A senses a short key input, and then a drag gesture is sensed by the touch sensors B, C, D, and E of the second input area 114, the touch sensing unit 120 supplies a hold on control signal as a power control signal PWR to the power controller 130 so that the mobile terminal 100 enters a hold on state to stop or prevent power from being supplied to some modules, components or devices, or to various parts of the mobile terminal 100 or to supply adjusted power to such parts, modules, components or devices of the mobile terminal 100, for example. Accordingly, such parts, modules, components or devices of the mobile terminal 100 are deactivated. The hold on control signal may have a second waveform having signal fluctuation for about 50 ms, for example, as shown in FIG. 5.

Then, if another "Short Key Touch & Drag" gesture is sensed by the touch sensing unit 120, when the mobile terminal 100 is in the hold on state, the touch sensing unit 120 supplies a hold off control signal to the power controller 130 so that the mobile terminal 100 is powered off. The hold off control signal may have the same waveform as the hold on control signal, for example, according to exemplary embodiments.

Figure 6:
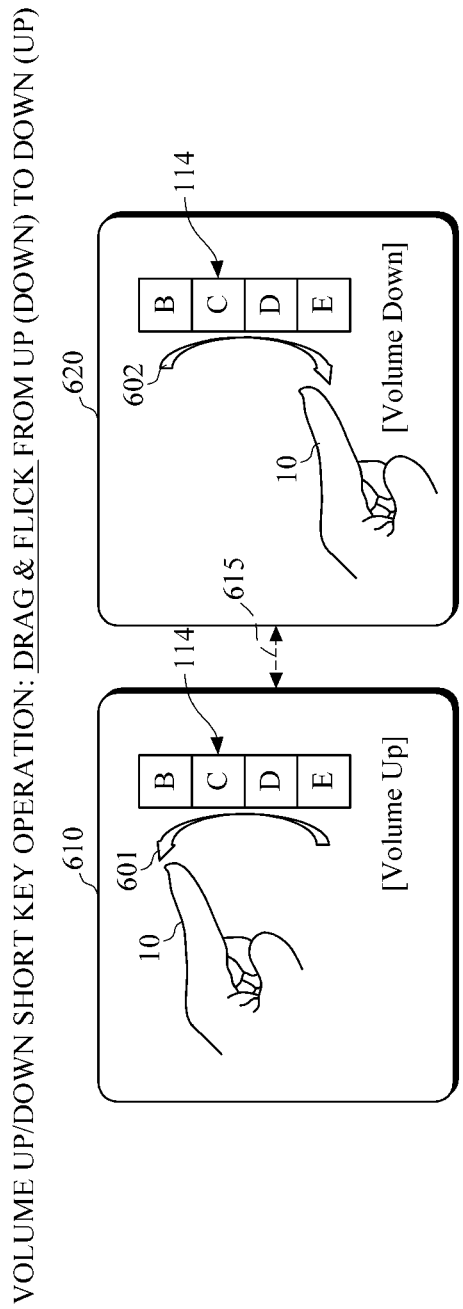
FIG. 6 illustrates touch inputs for volume control of a mobile terminal according to exemplary embodiments of the present invention.

FIG. 6 illustrates an example of a touch input for volume control of the mobile terminal 100 according to exemplary embodiments of the present invention.

Referring to FIG. 1 and FIG. 6, for example, when the mobile terminal 100 is in the power on state, a gesture of the user 10 of dragging the touch sensors B, C, D, and E of the second input area 114 may be classified according to a second reference time period (for example, a time period for which a change in capacitance is maintained if a capacitive touch sensor is used) for which a touch sensed signal input to the touch panel 110 sensed by the touch sensor at which the drag gesture is terminated is maintained, and according to the direction of the drag gesture. The time period for which the touch sensed signal sensed by the touch sensor at which the drag gesture is terminated is maintained may be used as a dragging time by the data processor/operation controller 150 for comparison with the second reference time period, for example.

Referring to FIG. 6, if a change in capacitance of the touch sensor at which a drag gesture is terminated is maintained for a shorter time period than the second reference time period, the drag gesture may be classified into a volume short key gesture, for example. And if a change in capacitance of the touch sensor at which another drag gesture is terminated is maintained for a longer time period than the second reference time period, the drag gesture may be classified into a volume long key gesture, for example. When the touch sensors B, C, D, and E of the second input area 114 are aligned vertically in this order, if a drag gesture from down to up (that is, the direction from the touch sensor E to the touch sensor B) is sensed by the touch sensing unit 120, the drag gesture may be classified into a volume up key gesture, such as to increase the volume output through a speaker 163 of the audio unit 162 of the mobile terminal 100, for example. And if another drag gesture from up to down (that is, the direction from the touch sensor B to the touch sensor E) is sensed by the touch sensing unit 120, the drag gesture may be classified into a volume down key gesture, such as to decrease the volume output through a speaker 163 of the audio unit 162 of the mobile terminal 100, for example, according to exemplary embodiments.

In addition, a volume up/down short key gesture called a "Drag & Flick" gesture, and a volume up/down long key gesture called a "Drag & Stop" gesture may be further defined or established, such as to selectively increase or decrease the volume output through the speaker 163 of the audio unit 162 of the mobile terminal 100, for example, according to exemplary embodiments.

Referring to the illustration 610 of FIG. 6, if a "Drag & Flick" gesture 601 of the user 10 of dragging the touch sensors B, C, D, and E of the second input area 114 in the direction from down to up (that is, the direction from the touch sensor E to the touch sensor B) is sensed by the touch sensing unit 120, the touch sensing unit 120 transfers a user input interrupt signal corresponding to the "Drag & Flick" gesture 601 to the data processor/operation controller 150. The data processor/operation controller 150 controls an application or an operation being executed according to the sensed user input interrupt signal. And, for example, if a "Drag & Flick" gesture is input to the second input area 114 and is sensed by the touch sensing unit 120, the data processor/operation controller 150 may perform at least one of volume control and turning the page according to the kind of application being executed by the mobile terminal 100. The "Drag & Flick" gesture 601 may be called a volume up short key gesture, for example, according to exemplary embodiments.

For example, when an audio play application is being executed by the mobile terminal 100, the data processor/operation controller 150 may perform a volume up operation if a "Drag & Flick" gesture, such as gesture 601 of FIG. 6, is input to the second input area 114 and is sensed by the touch sensing unit 120. If a "Drag & Flick" gesture such as gesture 601 of FIG. 6 is sensed when the data processor/operation controller 150 provides a web page or a page of an electronic book, the data processor/operation controller 150 may perform an operation of turning the page to the previous page, for example. That is, a "Drag & Flick" gesture input may result in various operations according to the kind of an application being executed by the data processor/operation controller 150, according to exemplary embodiments.

The touch sensing unit 120 may determine whether a touch input satisfies at least one of the reference wrong, or incorrect, operation conditions for the volume up short key in order to detect a wrong, or incorrect, operation related to a volume up short key. For example, a first reference wrong, or incorrect, operation condition for the volume up short key is a condition in which at least one of the touch sensors A, B, and C is pressed when the touch sensor E is pressed, a second reference wrong, or incorrect, operation condition is a condition in which the touch sensor A is pressed at or about the same time when the touch sensors C and D are pressed, and a third reference wrong, or incorrect, operation condition is a condition in which three or more touch sensors are at or about the same time pressed by the user 10 of the mobile terminal 100.

However, if a user 10 inputs a "Drag & Flick" gesture in an opposite direction, as indicated by the arrow line 615 to refer to the right illustration 620 of FIG. 6, such as a "Drag & Flick" gesture 602 of dragging the touch sensors B, C, D, and E of the second input area 114 in the direction from up to down (that is, in the direction from the touch sensor B to the touch sensor E) and is sensed by the touch sensing unit 120, the touch sensing unit 120 provides a user input interrupt signal corresponding to the "Drag & Flick" gesture 602 to the data processor/operation controller 150. The data processor/operation controller 150 controls an application being executed according to the user input interrupt signal. The "Drag & Flick" gesture 602 may be called a volume down short key gesture, for example, according to exemplary embodiments.

For example, when an audio play application is being executed, the data processor/operation controller 150 may perform the volume down operation if a "Drag & Flick" gesture such as gesture 602 of FIG. 6 is sensed by the touch sensing unit 120. If a "Drag & Flick" gesture, such as gesture 602 of FIG. 6, is sensed by the touch sensing unit 120 when the data processor/operation controller 150 provides a web page or a page of an electronic book, the data processor/operation controller 150 may perform the operation of turning the page to the next page, for example, according to exemplary embodiments.

As to the volume down short key gesture, a first reference wrong, or incorrect, operation condition for the volume down short key is a condition in which at least one of the touch sensors D and E is pressed when the touch sensor B is pressed, a second reference wrong, or incorrect, operation condition is a condition in which the touch sensor B is pressed at or about the same time when the touch sensors B and C are pressed, and a third reference wrong, or incorrect, operation condition is a condition in which three or more touch sensors are at or about the same time pressed, for example, according to exemplary embodiments.

Figure 7:
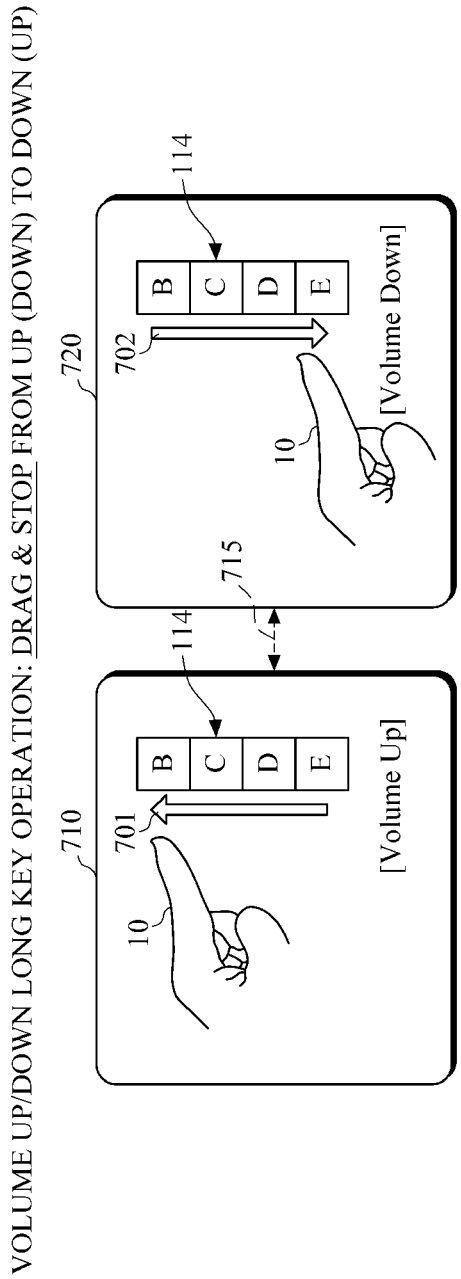
FIG. 7 illustrates touch inputs for volume control of a mobile terminal according to exemplary embodiments of the present invention.

FIG. 7 illustrates another example of touch inputs for volume control of the mobile terminal 100 according to exemplary embodiments of the present invention. The following description will be given with reference to FIG. 1 and FIG. 7.

Referring to the right illustration 710 of FIG. 7, if a "Drag & Stop" gesture 701 of dragging the touch sensors B, C, D, and E of the second input area 114 in the direction from down to up (that is, in the direction from the touch sensor E to the touch sensor B) is sensed by the touch sensing unit 120, the touch sensing unit 120 provides a user input interrupt signal corresponding to the "Drag & Stop" gesture to the data processor/operation controller 150. The "Drag & Stop" gesture corresponds to where a user 10 maintains a touch for a period of time longer than a flick at a location of the second input area 114 at which the drag gesture is terminated. In this case, a change in capacitance of the touch sensor at the location at which the drag gesture is terminated is sensed by the touch sensing unit 120 to be of a longer time period than a stop operation. If a "Drag & Stop" gesture is sensed by the touch sensing unit 120, the data processor/operation controller 150 may perform, for example, at least one of volume control and turning the page at a higher speed than when normal operation. The "Drag & Stop" gesture 701 may be called a volume up long key gesture, for example, according to exemplary embodiments.

For example, when an audio play application is being executed by the mobile terminal 100, the data processor/operation controller 150 may perform a volume up operation at a relatively high speed if a "Drag & Stop" gesture such as gesture 701 of FIG. 7 is sensed by the touch sensing unit 120. If a "Drag & Stop" gesture such as gesture 701 of FIG. 7 is sensed when the data processor/operation controller 150 provides a web page or a page of an electronic book, the data processor/operation controller 150 may perform an operation of turning the page to the previous page at a relatively high speed. Therefore, a "Drag & Stop" gesture input by a user 10 of the mobile terminal 100 may result in various operations according to the kind of an application being executed by the data processor/operation controller 150, according to exemplary embodiments.

However, if a user 10 inputs a "Drag & Stop" gesture in an opposite direction, as indicated by the arrow line 715 to refer to the right illustration 720 of FIG. 7, a "Drag & Stop" gesture 702 of dragging the touch sensors B, C, D, and E of the second input area 114 in the direction from up to down (that is, in the direction from the touch sensor B to the touch sensor E) is sensed by the touch sensing unit 120, the touch sensing unit 120 provides a user input interrupt signal corresponding to the "Drag & Stop" gesture 702 to the data processor/operation controller 150. The data processor/operation controller 150 controls an application being executed according to the user input interrupt signal. The "Drag & Stop" gesture 702 may be called a volume down long key gesture, for example, according to exemplary embodiments.

For example, when an audio play application is being executed by the mobile terminal 100, the data processor/operation controller 150 may perform a volume down operation at a relatively high speed if a "Drag & Stop" gesture, such as gesture 702 of FIG. 7, is sensed by the touch sensing unit 120. If a "Drag & Stop" gesture, such as gesture 702 of FIG. 7, is sensed when the data processor/operation controller 150 provides a web page or a page of an electronic book, the data processor/operation controller 150 may perform an operation of turning the page to the next page at a high speed, for example, according to exemplary embodiments.

Figure 8:
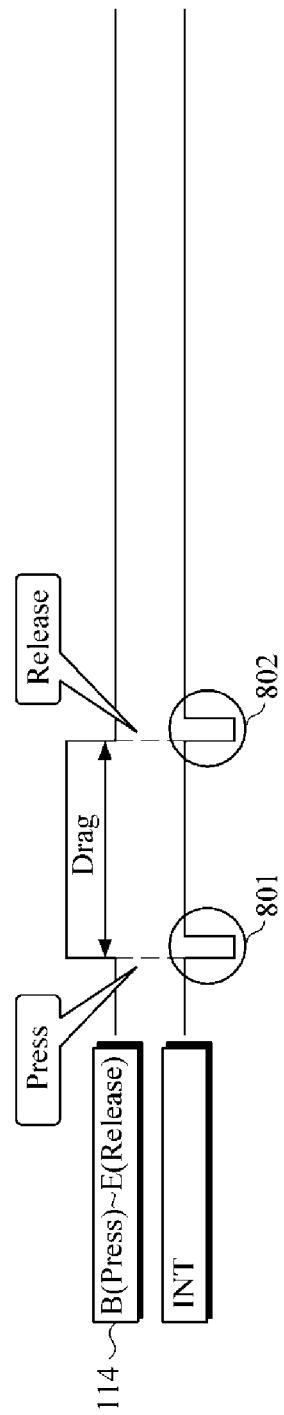
FIG. 8 illustrates a timing diagram of user interrupt signal pulses of the touch sensing unit according to a volume short key and a volume long key of a mobile terminal according to exemplary embodiments of the present invention.

FIG. 8 illustrates a timing diagram as an example of user interrupt signal pulses of the touch sensing unit 120 according to a volume short key and a volume long key of the mobile terminal 100 according to exemplary embodiments of the present invention.

Referring to FIG. 1 and FIG. 8, after the touch sensing unit 120 transmits a user input interrupt signal to the data processor/operation controller 150, the data processor/operation controller 150 may distinguish a long key from a short key when performing volume up/down operation, using the following operations, for example, according to exemplary embodiments.

At a press start time at which a user 10 starts to press the touch sensor at a location of the touch panel 110 at which dragging with respect to the touch sensors B, C, D, and E of the second input area 114 is started, the touch sensing unit 120 may send a first interrupt signal 801 to the data processor/operation controller 150, and at a press release time at which the user removes the user's finger from the touch sensor at a location at which the dragging is terminated, the touch sensing unit 120 may send a second interrupt signal 802 to the data processor/operation controller 150, according to exemplary embodiments.

In order to distinguish a "Drag & Flick" gesture from a "Drag & Stop" gesture upon the user inputting the volume up and down operations to the touch panel 110, the data processor/operation controller 150 may use a dragging time period which, for example, is a time period between the first interrupt signal 801 and the second interrupt signal 802, wherein the first interrupt signal 801 corresponds to a press start time at which dragging with respect to the touch sensors B, C, D, and E of the second input area 114 is started, and the second interrupt signal 802 corresponds to a press release time at which the user removes the user's finger from the touch sensor at a location of the touch panel 110 at which the dragging is terminated. If it is determined by the data processor/operation controller 150, that a dragging time period of a certain touch input is equal to or longer than a reference dragging time period (for example, 500 ms), the data processor/operation controller 150 may recognize the touch input as a long key input, and if it is determined that the dragging time period is shorter than the reference dragging time period, the data processor/operation controller 150 may recognize the touch input as a short key input, for example, according to exemplary embodiments.

Continuing with reference to FIG. 1 and FIG. 8, if the first interrupt signal 801 is received by the data/processor controller 150, the data processor/operation controller 150 accesses a second address of the register 212 of the touch sensing unit 120 to read a second register value from the second address. And then, if the second interrupt signal 802 is received by the data processor/operation controller 150, the data processor/operation controller 150 detects a time period between the first interrupt signal 801 and the second interrupt signal 802, which corresponds to a dragging time period, and determines a touch gesture of a user 10 of the mobile terminal 100 based on the dragging time period and gesture state information which the second register value represents, for example, according to exemplary embodiments.

If the time period between the first interrupt signal 801 and the second interrupt signal 802 is shorter than the reference dragging time period and the second register value represents a volume up gesture, the data processor/operation controller 150 may recognize the corresponding touch gesture as a volume up short key, and if the time period between the first interrupt signal 801 and the second interrupt signal 802 is shorter than the reference dragging time period and the second register value represents a volume down gesture, the data processor/operation controller 150 may recognize the corresponding touch gesture as a volume down short key, for example, according to exemplary embodiments. However, if the time period between the first interrupt signal 801 and the second interrupt signal 802 is equal to or longer than the reference dragging time period and the second register value represents a volume up gesture, the data processor/operation controller 150 may recognize the corresponding touch gesture as a volume up long key, and if the time period between the first interrupt signal 801 and the second interrupt signal 802 is equal to or longer than the reference dragging time period and the second register value represents a volume down gesture, the data processor/operation controller 150 may recognize the corresponding touch gesture as a volume down long key, for example, according to exemplary embodiments.

The above description relates to where when pressing of the user input to the touch panel 110 is done from the touch sensor E to the touch sensor B of the second input area 114, or when pressing of the user input of the touch panel 110 is done from the touch sensor B to the touch sensor E of the second input area 114, a gesture for volume up or down is recognized, for example, according to exemplary embodiments. However, if a certain drag gesture of the user 10 input to the touch panel 110 satisfies a reference gesture rate that represents an allowance criterion for recognition of the user input, the corresponding drag gesture can be recognized as a normal drag gesture, for example, according to exemplary embodiments. The reference gesture rate may be set to a ratio (for example, 80%) of touch sensors that generates touch sensed signals sequentially with respect to all touch sensors that are dragged, for example, according to exemplary embodiments. Therefore, a drag gesture from the touch sensor D to the touch sensor B may be sensed by the touch sensing unit 120 and recognized as a volume up gesture, and a drag gesture from the touch sensor C to the touch sensor E may be sensed by the touch sensing unit 120 and recognized as a volume down gesture, for example, according to exemplary embodiments.

Figure 9:
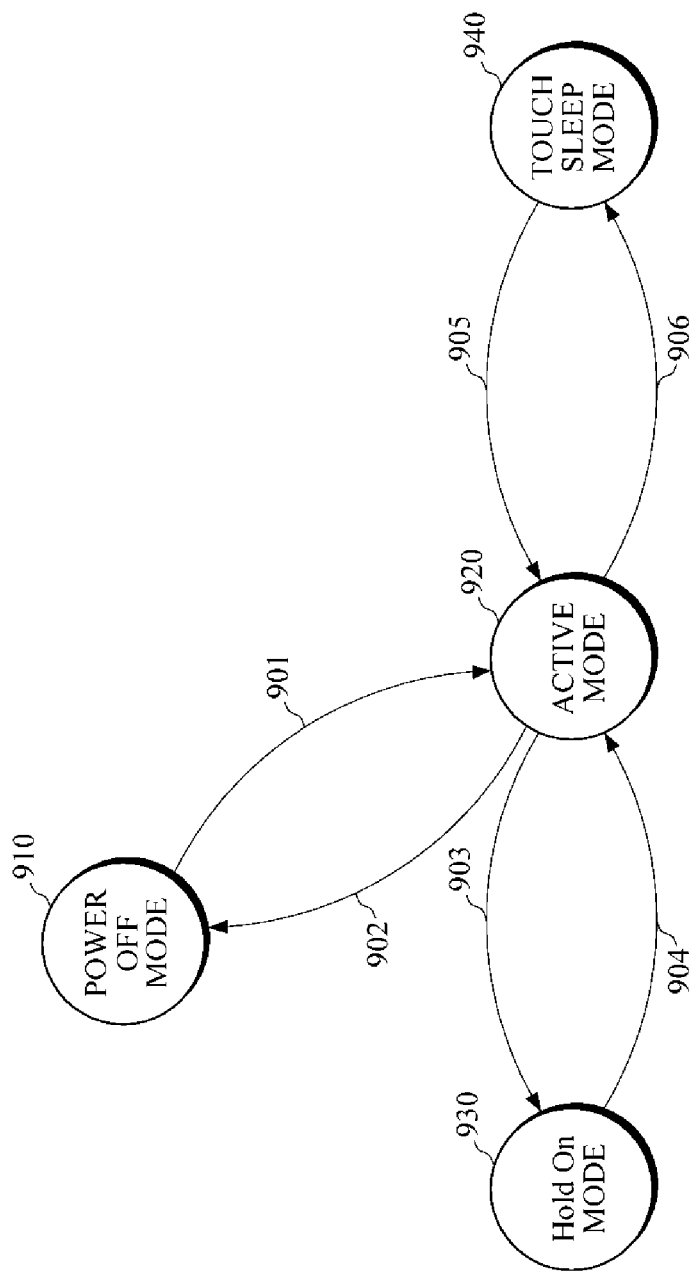
FIG. 9 illustrates a state model of a mobile terminal according to exemplary embodiments of the present invention.

FIG. 9 illustrates an example of a state model of the mobile terminal 100 according to exemplary embodiments of the present invention.

As illustrated in FIG. 9, the operation modes of the mobile terminal 100 include a power off mode 910, an active mode 920, a hold on mode 930, and a touch sleep mode 940, for example, according to exemplary embodiments of the present invention.

For example, referring to FIGS. 1 and 9, the power off mode 910 is a power off state in which no power from the power supply 140 is supplied to substantially all of the components, modules and devices of the mobile terminal 100. But in the power off mode 910, the touch sensing unit 120 is supplied power and is in a turned on state, and the touch sensing unit 120 activates only the first input area 112, which is a power key input area, but may alternatively activate the second input area 114, according to exemplary embodiments. If a power on touch input or touch input gesture is sensed in the power off mode 910, the power on mode is converted into the active mode 920, as indicated by an arrow 901 of FIG. 9. If a power off touch input or touch input gesture is sensed in the active mode 920, the active mode 920 is converted into the power off mode 910, as indicated by an arrow 902, for example, according to exemplary embodiments.

For example, the active mode 920, the hold on mode 930, and the touch sleep mode 940 illustrated in FIG. 9 are modes of the mobile terminal 100 that is in a power on state, according to exemplary embodiments.

In FIG. 9, the active mode 920 represents a state in which power is supplied to the mobile terminal 100, both the touch panel 110 and the touch screen 113 of display unit 111 are activated so that all functions of the mobile terminal 110 operate normally, user inputs to the touch panel 110 can be received, and applications can be executed by the mobile terminal 100 according to the user inputs to the touch panel 110, for example, according to exemplary embodiments.

In the hold on mode 930, some functions or parts of the mobile terminal 100 are deactivated since no power is supplied to the corresponding modules of the mobile terminal 100 that are to be placed in the hold on mode 930. In the hold on mode 930, the first input area 112 of the touch panel 110 is activated and the second input area 114 is deactivated so that only user inputs of touching the first input area 112 can be sensed. If a hold off gesture (Short Key Touch & Drag) is sensed in the hold on mode 930, the hold on mode 930 is converted into the active mode 920, as indicated by an arrow 904, for example, according to exemplary embodiments.

The touch sleep mode 940 is a mode which the touch sensing unit 120 enters, as indicated by an arrow 906, when no user touch input onto the touch panel 110 is sensed for a reference input sensed time period in the active mode 920. When the mobile terminal 100 is in the touch sleep mode 940, the state of the mobile terminal 100 is substantially the same as when the mobile terminal 100 is in the active mode 920, except for the state of the touch sensing unit 120. The touch sleep mode 940 is a mode for reducing power consumption of the touch sensing unit 120 when no touch input is sensed for the reference input sensed time period in the active mode 920. When a touch gesture of the user 10 of touching the touch panel 110 is sensed by the touch sensing unit 120 in the touch sleep mode 940, the touch sleep mode 940 is converted into the active mode 920, as indicated by an arrow 905, for example, according to exemplary embodiments.

The data processor/operation controller 150 operates according to the power off mode 910, the active mode 920, and the hold on mode 930, and such operation mode may depend upon a user 10's touch input to the touch panel 110. And whenever the mobile terminal 100 enters each operation mode, the data processor/operation controller 150 may set a register value corresponding to the mode as a first register value and write the first register value in the first address of the register 212 of the touch sensing unit 120, for example, according to exemplary embodiments. For example, when the mobile terminal 100 enters the power off mode 910, the data processor/operation controller 150 may write a value 0xF0 as a first register value in the first address of the register 212 of the touch sensing unit 120, and when the mobile terminal 100 enters the active mode 920, the data processor/operation controller 150 may write a value 0xF8 as state information in the first address of the register 212, for example, according to exemplary embodiments.

For example, the touch sensing unit 120 may control the touch panel 110 according to the first register value. In the power off mode 910 and the hold on mode 930, only the first input area 112 of the touch panel 110 is activated, and in the active mode 920, both the first input area 112 and the second input area 114 of the touch panel 110 are activated, for example. Also, in the touch sleep mode 940, both the first input area 112 and the second input area 114 are activated while controlling the touch panel 110 so that the touch panel 110 consumes less power than in the active mode 920, for example, according to exemplary embodiments.

However, when a user's unintended touch key is input to the touch panel 110, if another touch input is no longer sensed for the reference input sensed time period (for example, 5 seconds), although the mode of the mobile terminal 100 is converted, the mobile terminal 100 may return to its previous mode, according to exemplary embodiments. For example, when a touch input of the user 10 is sensed by the touch sensing unit 120 in the touch sleep mode 940, and, thus, the mobile terminal 100 enters the active mode 920, if another touch input is no longer sensed by the touch sensing unit 120, the mobile terminal 100 may return to the touch sleep mode 940. The operation to return to the active mode 920 may be applied in a similar or substantially the same manner to when the mobile terminal 100 is in the hold on mode 930 and the power off mode 910, for example, according to exemplary embodiments.

Figure 10:
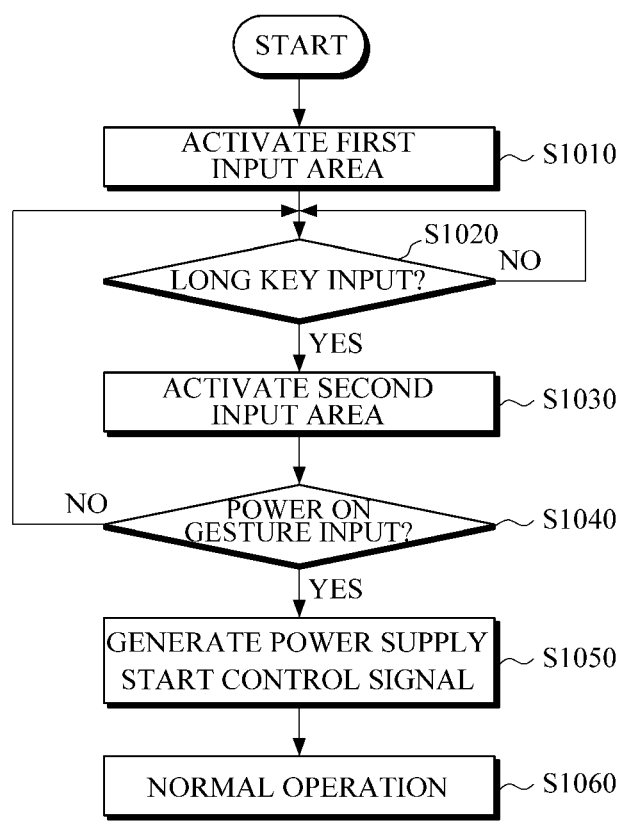
FIG. 10 is a flowchart illustrating methods in which a mobile terminal operates according to a power control gesture according to exemplary embodiments of the present invention.

FIG. 10 is a flowchart illustrating an example of methods in which the mobile terminal 100 operates according to a power control gesture according to exemplary embodiments of the present invention.

Referring to FIG. 1 and FIG. 10, when the mobile terminal 100 is in the power off state, only the first input area 112 of the touch panel 110 is activated in operation S1010.

However, if a long key is input by the user 10 through the first input area 112 so that a touch sensed signal is maintained for the first reference time period in operation S1020, the touch sensing unit 120 activates the second input area 114 at operation S1030.

Then, if a power on gesture of the user 10 touching the second input area 114 is sensed so that a drag touch sensed signal is generated when the second input area 114 is in the activated state at operation S1040, the touch sensing unit 120 generates a power supply start control signal to supply power to the mobile terminal 100 at operation S1050. And the power controller 130 supplies power, such as from the power supply 140, to the modules, components and devices of the mobile terminal 100, according to the power supply start control signal, so that the mobile terminal 100 operates normally, such as in the active mode 920 at operation S1060.

Figure 11:
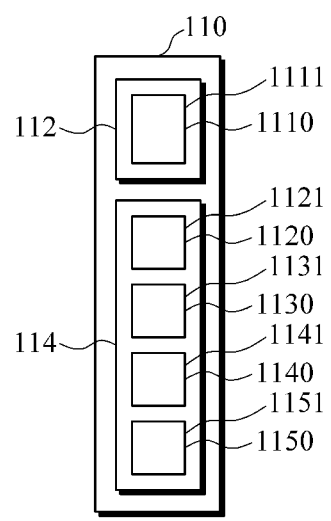
FIG. 11 is a diagram illustrating a touch panel of a mobile terminal according to exemplary embodiments of the present invention.

FIG. 11 is a diagram illustrating a front view of the touch panel 110 of the mobile terminal 100 illustrated in FIG. 1 according to exemplary embodiments. In FIG. 11, the touch panel 110 may include a plurality of touch sensors, such as touch sensors 1110, 1120, 1130, 1140 and 1150, formed on a FPCB as described above. The touch panel 110 includes a first input area 112 and a second input area 114, which are spaced from each other at a reference input area distance on the touch panel 110.

Referring to FIG. 11, because the operation of the mobile terminal 100 is changed according to a touch gesture of the user 10 onto the first input area 112 and a touch gesture of the user 10 onto the second input area 114, the reference input area distance at which the first input area 112 and the second input area 114 are spaced apart from each other may minimize or reduce the mobile terminal 10 from operating erroneously, according to exemplary embodiments. For example, when the mobile terminal 100 is in the active mode 920 and there is a touch input of user 10 onto the first input area 112, while a gesture of the user 10 is input to the second input area 114 to, for example, control volume, the mobile terminal 100 may not operate so as to be switched to the hold on mode 930 or power-off mode 910, according to exemplary embodiments.

As shown in FIG. 11, the first input area 112 may include at least one touch sensor, such as the touch sensor 1110, and the second input area 114 may include a plurality of touch sensors, such as touch sensors 1120, 1130, 1140, and 1150, for example. The touch sensors 1120, 1130, 1140, and 1150 may be arranged in a line to sense a drag gesture, but may be arranged in other suitable arrangements, depending on the use or application, according to exemplary embodiments.

Each of the touch sensors 1110, 1120, 1130, 1140, and 1150 may be formed as a touch pad on an FPCB onto which a user 10's touch is made. If the touch sensors 1110, 1120, 1130, 1140, and 1150 are capacitive touch sensors, the touch pads may be made of a conductive material, for example. The touch pads 1111, 1121, 1131, 1141 and 1151 corresponding to touch surfaces of the respective touch sensors 1110, 1120, 1130, 1140, and 1150 may be rectangular-shaped as shown in FIG. 11, or may vary in shape, such as circular or oval, for example, according to exemplary embodiments.

The touch sensors 1110, 1120, 1130, 1140, and 1150 may be connected to the respective input/output ports I/O 1, I/O 2, I/O 3/ I/O 4, and I/O 5 of the touch sensing unit 120 shown in FIG. 1 through a plurality of transmission channels installed on an inner layer of the FPCB. The touch sensors 1110, 1120, 1130, 1140, and 1150 of the touch sensing unit 120 may be activated by a control signal from the touch sensing unit 120, and each may transmit a touch sensed signal to the corresponding input/output port I/O 1, I/O 2, I/O 3/ I/O 4, and I/O 5 of the touch sensing unit 120, according to exemplary embodiments.

Figure 12:
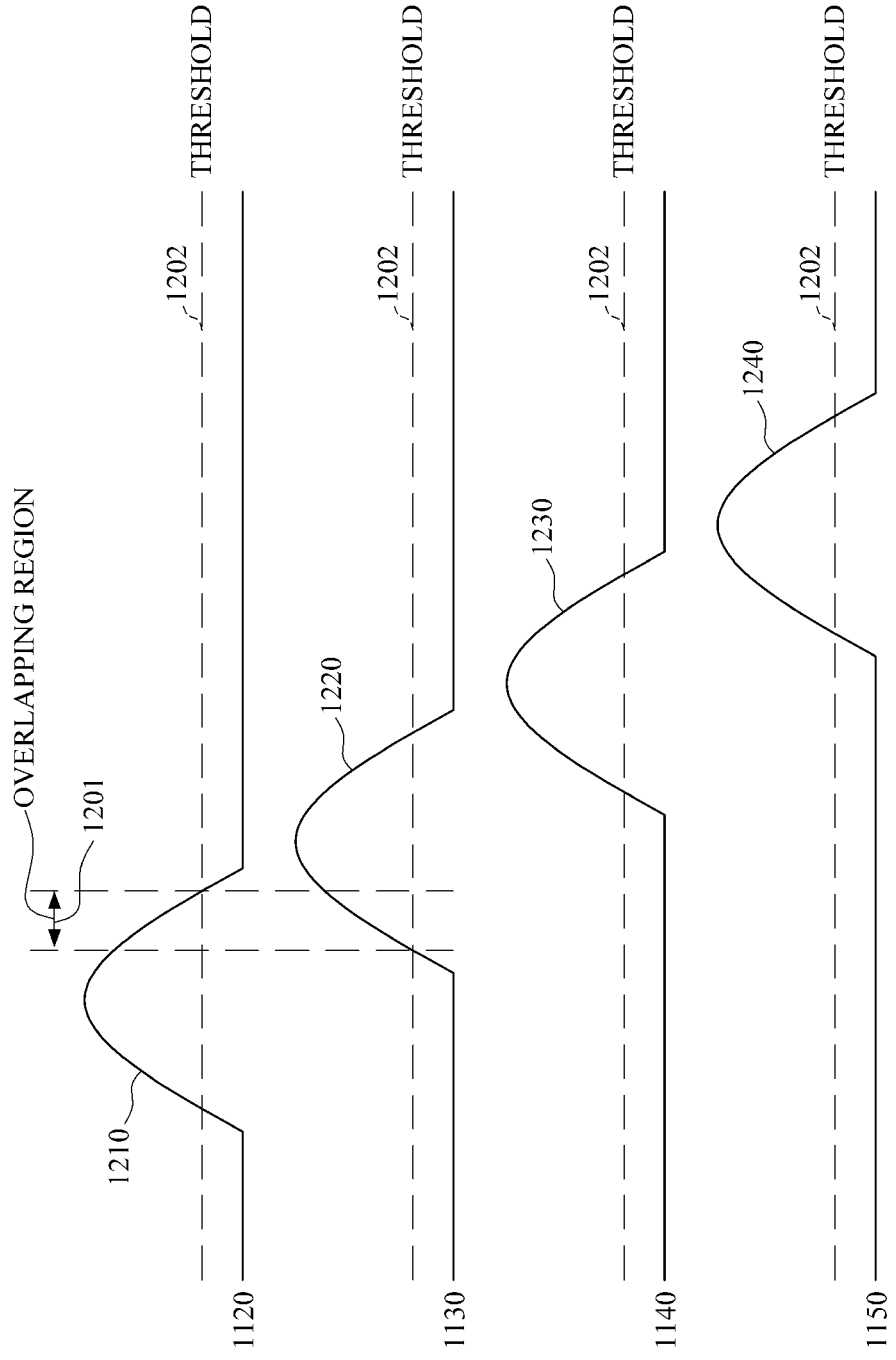
FIG. 12 is a diagram illustrating a signal pulse of a touch-sensed signal in a second input area of a mobile terminal according to a drag gesture according to exemplary embodiments of the present invention.

FIG. 12 is a timing diagram illustrating an example of a signal pulse of a touch-sensed signal in the second input area 114 of FIG. 11 of the mobile terminal 100 according to a drag gesture, according to exemplary embodiments of the present invention.

Referring to FIG. 11 and FIG. 12, in response to a drag gesture being input to the touch sensors 1120, 1130, 1140, and 1150 included in the second input are 114, the touch sensors 1120, 1130, 1140, and 1150 sequentially generate touch-sensed signals and transmit the touch-sensed signals to the touch sensing unit 120. In response to a top-to-bottom drag in the second input area 114, the touch-sensed signals are generated as shown in FIG. 12, for example. Intervals between a signal pulse 1210 of a touch-sensed signal of the touch sensor 1120, a signal pulse 1220 of a touch-sensed signal of the touch sensor 1130, a signal pulse 1230 of a touch-sensed signal of the touch sensor 1140, and a signal pulse 1240 of a touch-sensed signal of the touch sensor 1150 may vary according to a drag gesture speed and a user 10 finger's contact area during the input of the drag gesture on each touch sensor of the touch panel 110. Intervals between the signal pulses 1210, 1220, 1230 and 1240 may be measured based on intervals between peak values of the signal pulses or overlapping regions between the signal pulses, for example, as described further herein, according to exemplary embodiments.

The example shown in FIG. 12 assumes that the signal pulses 1210, 1220, 1230 and 1240 are generated when a drag gesture is made at a first speed, and if there is input a drag gesture slower than the first speed, the intervals between the signal pulses may be increased. If a drag gesture is made faster than the first speed, the intervals between the signal pulses 1210, 1220, 1230 and 1240 may be reduced. Further, when a drag gesture is input to the second input area at or about the same speed as the first speed, as a contact area on the second input area 114 is greater, the intervals between the signal pulses 1210, 1220, 1230 and 1240 become narrower, for example, according to exemplary embodiments.

In FIG. 12, for example, in an exemplary overlapping region 1201, at least two signal pulses of the touch-sensed signals simultaneously become greater than a threshold 1202. Here, the threshold 1202 may be set as a change in capacitance if the touch sensor is a capacitive touch sensor, and the threshold 1202 may be set to other various values according to a type of the touch sensor, for example. If the overlapping regions of the signal pulses 1210, 1220, 1230 and 1240 become smaller than a reference overlap range because the intervals between the signal pulses 1210, 1220, 1230 and 1240 may be reduced, a recognition rate of a drag gesture may deteriorate. For example, where a drag gesture is input onto the second input area 114, the touch sensing unit 120 may fail to recognize the drag gesture, such as where the input touches are sequentially input to the touch sensors 1120, 1130, 1140, and 1150 in the second input area 114, and instead determine the drag gesture as one or two different touches, for example, which may result in the input drag gesture being ignored by the touch sensing unit 120.

In one example, the touch pads 1121, 1131, 1141 and 1151 on the respective touch sensors 1120, 1130, 1140, and 1150 may be configured to have the overlapping regions of the sensed signals of the touch sensors 1120, 1130, 1140, and 1150 to be greater than a reference threshold range when a drag gesture is input to the touch sensors 1120, 1130, 1140, and 1150 at a particular speed for example, according to exemplary embodiments. Also, touch sensor 1110 includes a touch pad 1111, for example.

Figure 13:
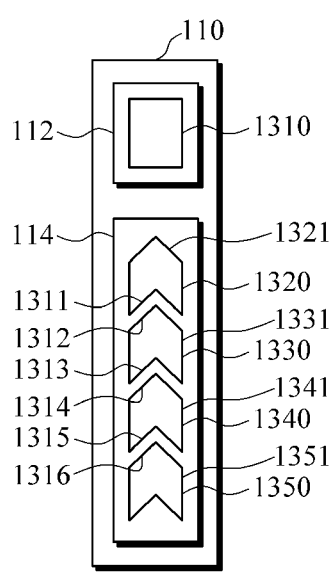
FIG. 13 is a diagram illustrating a touch panel of a mobile terminal according to exemplary embodiments of the present invention.

The touch pads of the touch sensors to receive a user input may have bent-shaped ends, such as illustrated in FIG. 13, for example. In another example, an end of each touch pad that is adjacent to another touch pad may have a saw-toothed shape, such as illustrated in FIG. 14, or round shaped, such as illustrated in FIG. 15, for example, according to exemplary embodiments, as discussed herein.

FIG. 13 is a diagram illustrating another example of the touch panel 110 shown in FIG. 1 of the mobile terminal 100 according to exemplary embodiments of the present invention.

As shown in FIG. 13, the touch panel 110 includes a first input area 112 and a second input area 114. The first input area 112 includes a touch sensor 1310 and the second input area 114 includes a plurality of touch sensors 1320, 1330, 1340, and 1350. Touch pads 1321, 1331, 1341 and 1351 are provided to at least one of the ends of the respective touch sensors 1320, 1330, 1340 and 1350 to receive a user input. Ends 1311, 1312, 1313, 1314, 1315, and 1316 of each touch pad adjacent to another touch pad have a bent shape, such as similar to a V-shape. The ends 1311, 1312, 1313, 1314, 1315, and 1316 may also have a bent shape, such as similar to a reversed V-shape, for example, according to exemplary embodiments.

Figure 14:
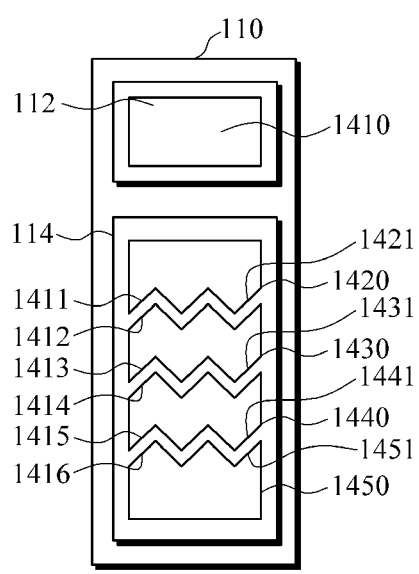
FIG. 14 is a diagram illustrating a touch panel of a mobile terminal according to exemplary embodiments of the present invention.
Figure 15:
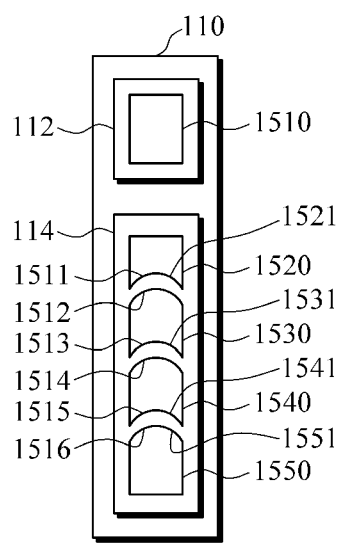
FIG. 15 is a diagram illustrating a touch panel of a mobile terminal according to exemplary embodiments of the present invention.

FIG. 14 is a diagram illustrating a further example of the touch panel shown 110 in FIG. 1 of the mobile terminal 100 according to exemplary embodiments of the present invention.

As shown in FIG. 14, the touch panel 110 includes the first input area 112 and the second input area 114. The first input area 112 includes a touch sensor 1410 and the second input area 114 includes a plurality of touch sensors 1420, 1430, 1440, and 1450. Touch pads 1421, 1431, 1441 and 1451 are provided to at least one of the surfaces of the respective touch sensors 1420, 1430, 1440, and 1450 to receive a user input. Ends 1411, 1412, 1413, 1414, 1415, and 1416 of each touch pad adjacent to another touch pad may have a saw-toothed shape, for example, according to exemplary embodiments.

FIG. 15 is a diagram illustrating an additional example of the touch panel 110 shown in FIG. 1 of the mobile terminal 100 according to exemplary embodiments of the present invention.

As shown in FIG. 15, the touch panel 110 includes the first input area 112 and the second input area 114. The first input area 112 includes a touch sensor 1510 and the second input area 114 includes a plurality of touch sensors 1520, 1530, 1540, and 1550. Touch pads 1521, 1531, 1541 and 1551 are provided to at least one of the surfaces of the respective touch sensors 1520, 1530, 1540, and 1550 to receive a user input. Ends 1511, 1512, 1513, 1514, 1515 and 1516 of each touch pad adjacent to another touch pad may have a round shape, such as similar to a U-shape, for example, according to exemplary embodiments.

According to the examples and exemplary embodiments described above, since touch-based keys, such as a touch-based power key and a touch-based volume key, instead of mechanical switches, can be configured on the outer surface of the mobile terminal, it is possible to improve a design of a mobile terminal and achieve increased or improved reliability in operation of the mobile terminal.

Further, according to exemplary embodiments, with the structure of the touch panel according to the examples described above, it is possible to increase a recognition rate of a touch gesture to improve reliability in operation of the mobile terminal.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention. Further, the record medium may be implemented in the form of a carrier wave such as Internet transmission. In addition, the computer readable record medium may be distributed to computer systems over a network, in which computer readable codes may be stored and executed in a distributed manner.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A mobile terminal to operate based on a touch input, the mobile terminal comprising:
a unitary touch panel comprising a first input area and a second input area to receive at least one touch input to generate at least one touch sensed signal; and
a touch sensing unit to generate at least one control signal corresponding to the at least one touch sensed signal,
wherein the first input area remains activated in a power off state of the mobile terminal to generate the touch sensed signal to enable generation of the control signal for a power on state of the mobile terminal, the second input area is initially deactivated in the power off state and is activated by generation of the touch sensed signal corresponding to a touch input applied to the first input area in the power off state, and the mobile terminal is configured to require touch sensed signals corresponding to touch input to both of the first input area and the second input area by requiring a first touch sensed signal from the first input area for a period longer than a first reference time period of about 1 second and a sequential second touch sensed signal indicating a drag gesture from the second input area to allow a power on state of the mobile terminal.

2. The mobile terminal of claim 1, wherein:
the first input area generates the touch sensed signal corresponding to a power control signal to selectively control power to the mobile terminal, and
the second input area generates the touch sensed signal corresponding to the at least one power control signal to selectively control power to the mobile terminal or corresponding to a user input interrupt signal to selectively control at least one operation of the mobile terminal or execution of an application by the mobile terminal.

3. The mobile terminal of claim 1, wherein:
the touch sensing unit determines whether the one or more touch sensed signals correspond to a power control signal to selectively control power to the mobile terminal or to a user input interrupt signal to selectively control at least one operation of the mobile terminal or execution of an application by the mobile terminal, based on a current operation mode of the mobile terminal.

4. The mobile terminal of claim 1, wherein:
the touch sensing unit determines whether the received one or more touch sensed signals correspond to a power control signal to selectively control power to the mobile terminal or to a user input interrupt signal to selectively control at least one operation of the mobile terminal or execution of an application by the mobile terminal, based on at least one of the touch input being applied to the first input area for equal to, longer than, or shorter than the first reference time period or an input touch gesture to the second input area being maintained for equal to, longer than, or shorter than a second reference time period.

5. The mobile terminal of claim 1, wherein the control signal comprises a power control signal, the power control signal comprising at least one of
a power supply start control signal to enable powering on the mobile terminal to operate in an active mode,
a power supply stop control signal to enable powering off the mobile terminal to stop operation of the mobile terminal in the active mode,
a hold on control signal to enable selectively deactivating operation of parts of the mobile terminal to operate the mobile terminal in a hold on state, and a hold off control signal to enable returning the mobile terminal from the hold on state to a power on state and the active mode.

6. The mobile terminal of claim 1, wherein the touch sensing unit remains activated in the power off state to enable receiving the at least one touch sensed signal to enable generation of the control signal to place the mobile terminal in a power on state.

7. The terminal of claim 1, wherein:
a power on state of the mobile terminal comprises one or more of an active mode in which power is supplied to the mobile terminal to operate normally, a hold on mode in which power is selectively supplied to the mobile terminal to deactivate operation of parts of the mobile terminal, and a touch sleep mode in which the touch input to the touch panel is absent for a reference time period and the mobile terminal operates as in the active mode other than the touch sensing unit to which power for operation is reduced, and
the power off state of the mobile terminal comprises a power off mode in which the power supplied to the mobile terminal is stopped, other than to first input area to enable generation of the at least one touch sensed signal and to the touch sensing unit to enable generation of at least one a control signal corresponding to the power on state.

8. The mobile terminal of claim 1, wherein:
the touch sensing unit determines whether the received at least one touch input corresponds to an incorrect operation condition of the mobile terminal based on a comparison with at least one reference incorrect operation condition.

9. The mobile terminal of claim 1, further comprising:
a power controller to receive the at least one control signal from the touch sensing unit, when the at least one control signal generated by the touch sensing unit corresponds to a power control signal, and to selectively control a power on state and the power off state of the mobile terminal based on the power control signal; and
an operation controller to receive the at least one control signal from the touch sensing unit, when the at least one control signal generated by the touch sensing unit corresponds to a user input interrupt signal, and to selectively control at least one operation of the mobile terminal or execution of an application by the mobile terminal based on the user input interrupt signal.

10. The mobile terminal of claim 1, wherein the at least one control signal comprises a user interrupt control signal, the user interrupt control signal comprises one or more of at least one control signal to perform execution of an operation or an application by the mobile terminal, at least one control signal to perform a page turning operation for at least one page displayed on a display screen of a display unit of the mobile terminal, or at least one control signal to perform a volume control of sound for the mobile terminal.

11. The mobile terminal of claim 1, further comprising:
a display to indicate the touch panel has received the at least one touch input in the power off state.

12. A method for operating a mobile terminal based on a touch input, the method comprising:
receiving at least one touch input to a unitary touch panel of the mobile terminal, the touch panel comprising a first input area and a second input area;
generating at least one touch sensed signal corresponding to the at least one touch input to one or more of the first input area and the second input area;
generating at least one control signal corresponding to the at least one touch sensed signal,
wherein the first input area remains activated in a power off state of the mobile terminal to generate the touch sensed signal to enable generation of the control signal for a power on state of the mobile terminal, the second input area is initially deactivated in the power off state and is activated by generation of the touch sensed signal corresponding to a touch input applied to the first input area in the power off state, and touch sensed signals corresponding to touch input to both of the first input area and the second input area are required in a form of a first touch sensed signal from the first input area for a period longer than a first reference time period of about 1 second and a sequential second touch sensed signal indicating a drag gesture from the second input area to allow a power on state of the mobile device.

13. The method of claim 12, further comprising:
generating at least one power control signal according to a state of the mobile terminal and in response to the at least one touch sensed signal.

14. The method of claim 12, wherein generating the at least one control signal further comprises:
selectively generating a power supply start control signal as a power control signal to enable supplying power to the mobile terminal to operate in an active mode in which power is supplied to the mobile terminal to operate normally;
selectively generating a power supply stop control signal as the power control signal to enable a stopping operation of the mobile terminal in the active mode;
selectively generating a hold on control signal as the power control signal to enable deactivating operation of parts of the mobile terminal to operate the mobile terminal in a hold on state in which power is selectively supplied to the mobile terminal to deactivate operation of parts of the mobile terminal; and
selectively generating a hold off control signal as the power control signal to enable returning the mobile terminal from the hold on state to the power on state and the active mode.

15. The method of claim 12, further comprising:
deactivating power supplied to the mobile terminal in the power off state, other than to enable generation of the at least one touch sensed signal and the at least one control signal to place the mobile terminal in a power on state.

16. The method of claim 12, wherein generating at least one touch sensed signal further comprises:
generating the touch sensed signal corresponding to a power control signal to selectively control power supplied to the mobile terminal when the touch sensed signal is generated based on the touch input to a first input area of the touch panel; and
generating the touch sensed signal corresponding to at least one of the power control signal or a user input interrupt signal to selectively control at least one operation of the mobile terminal or execution of an application by the mobile terminal when the touch sensed signal is generated based on the touch input to the second input area of the touch panel.

17. The method of claim 12, further comprising:
determining whether the generated at least one touch sensed signal corresponds to a power control signal to selectively control power supplied to the mobile terminal or a user input interrupt signal to selectively control at least one operation of the mobile terminal or execution of an application by the mobile terminal, based on a current operation mode of the mobile terminal.

18. The method of claim 1, further comprising:
determining whether the generated at least one touch sensed signal corresponds to a power control signal to selectively control power supplied to the mobile terminal or to a user input interrupt signal to selectively control at least one operation of the mobile terminal or execution of an application by the mobile terminal, based on at least one of whether the touch input is applied to a first input area of the touch panel for equal to, longer than, or shorter than the first reference time period or whether an input touch gesture applied to the second input area of the touch panel is maintained for equal to, longer than, or shorter than a second reference time period.

19. The method of claim 12, further comprising:
determining whether the generated at least one touch sensed signal from the touch panel corresponds to an incorrect operation condition of the mobile terminal based on a comparison with at least one reference incorrect operation condition.

20. The method of claim 12, further comprising:
selectively controlling a volume of sound for the mobile terminal based on the generated corresponding at least one control signal.

21. The method of claim 12, further comprising:
selectively performing a page turning operation for at least one page displayed on a display screen of a display unit of the mobile terminal based on the generated corresponding at least one control signal.

22. The method of claim 12, further comprising:
selectively executing an operation or an application by the mobile terminal based on the corresponding generated at least one control signal.

23. The method of claim 12, further comprising:
indicating the touch panel is receiving the at least one touch input in the power off state.

24. The method of claim 12, further comprising:
determining whether an input touch gesture satisfies a reference gesture rate that represents an allowance criterion to recognize the at least one touch input to the touch panel.

25. A method for operating a mobile terminal based on a touch input, the method comprising:
activating a first input area of a unitary touch panel of the mobile terminal to generate at least one touch sensed signal in a power off state of the mobile terminal;
inactivating a second input area of the unitary touch panel in the power off state;
activating the second input area of the unitary touch panel to generate at least one second touch sensed signal when the at least one touch sensed signal is generated from the first input area in the power-off state; and
generating at least one control signal corresponding to both the generated at least one touch sensed signal from the first input area and the at least one second touch sensed signal from the second input area by requiring a first touch sensed signal from the first input area for a period longer than a first reference time period of about 1 second and a sequential second touch sensed signal indicating a drag gesture from the second input area to place the mobile terminal in a power-on state.

\* \* \* \* \*